United States Patent [19]
Sato

[11] Patent Number: 5,899,954
[45] Date of Patent: May 4, 1999

[54] CURRENT POSITION CALCULATING SYSTEM HAVING A FUNCTION FOR CORRECTING A DISTANCE FACTOR

[75] Inventor: Hiroyuki Sato, Yamato, Japan

[73] Assignee: Xanavi Informatics Corporation, Zama, Japan

[21] Appl. No.: 08/629,853

[22] Filed: Apr. 9, 1996

[30] Foreign Application Priority Data

Apr. 21, 1995 [JP] Japan ..................................... 7-97201

[51] Int. Cl.$^6$ .................................................. G06F 165/00
[52] U.S. Cl. ........................ 701/207; 701/208; 701/210; 701/214; 340/988
[58] Field of Search .................................... 701/201, 202, 701/206, 207, 208, 209, 210, 212, 214, 216, 200, 94; 340/990, 995, 988; 73/178 R

[56] References Cited

U.S. PATENT DOCUMENTS

| | | | |
|---|---|---|---|
| 5,014,204 | 5/1991 | Kamimura et al. ...................... | 701/207 |
| 5,031,103 | 7/1991 | Kamimura et al. ...................... | 701/207 |
| 5,546,311 | 8/1996 | Sekine ..................................... | 701/208 |

FOREIGN PATENT DOCUMENTS

| | | | |
|---|---|---|---|
| 0 564 140 A1 | 3/1993 | European Pat. Off. ........ | G01C 21/00 |
| 0 607 654 A2 | 10/1993 | European Pat. Off. ........ | G01C 21/20 |
| 2-107985 | 4/1990 | Japan ................................. | G01S 5/02 |
| 6-13972 | 2/1994 | Japan ............................. | G01C 21/00 |
| 6-27652 | 4/1994 | Japan ............................. | G01C 21/00 |

Primary Examiner—William A. Cuchlinski, Jr.
Assistant Examiner—Gertrude Arthur
Attorney, Agent, or Firm—Pennie & Edmonds LLP

[57] ABSTRACT

A current position calculation system is provided for adequately correcting a distance factor which is used for obtaining a travelled distance by utilizing various information at the time when a vehicle turns left or right. According to an output from a headed direction detecting device, an output from a travelled distance calculating device and road data of a road map, at the time when the vehicle turns left or right from a first road to a second road, there is obtained a distance error amount d which is an error in an output from the travelled distance calculating device with respect to an actual value it should be. The distance error amount d is corrected so as to be reduced. In order to obtain the distance error amount d, a moving path of the vehicle position is estimated without considering whether the position is on or off a road after completing the left or right turn, it is checked whether the estimated moving path of the vehicle position is an overshoot or an undershoot with respect to the second road on the road map, and the amount of the overshoot or the undershoot is obtained as the aforementioned distance error amount d.

7 Claims, 10 Drawing Sheets

FIG. 7A  LEFT TURN, OVERSHOOT
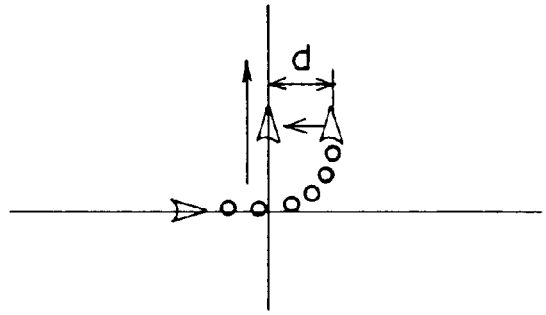
FIG. 7B  LEFT TURN, UNDERSHOOT
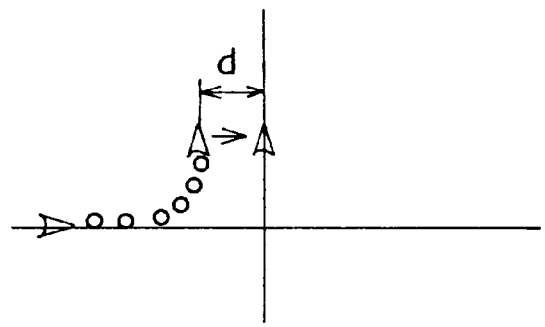
FIG. 7C  RIGHT TURN, OVERSHOOT
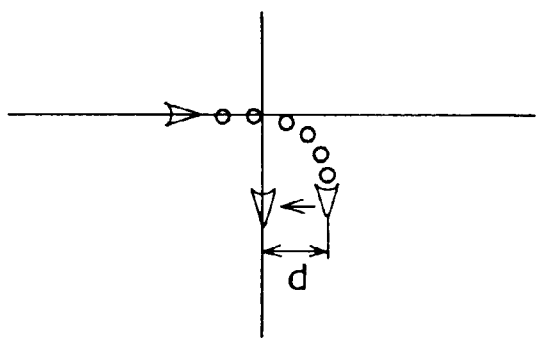
FIG. 7D  RIGHT TURN, UNDERSHOOT
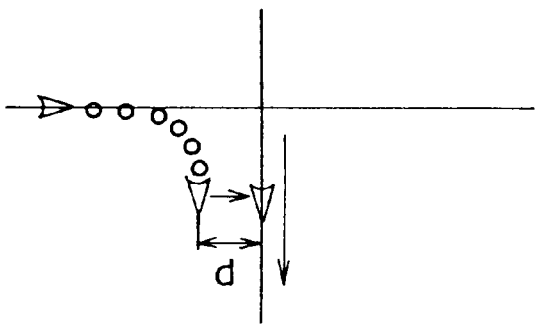

INITIALIZING PROCESS

FIG. 10

CALCULATION OF CORRECTING AMOUNT hkin
ACCORDING TO ROAD WIDTH DATA

| ROAD WIDTH DATA $\begin{pmatrix} \text{EQUAL TO OR MORE} \\ \text{THAN} \sim \text{LESS THAN} \end{pmatrix}$ [m] | CORRECTING AMOUNT hkin [m] |
|---|---|
| 0.0 ~ 5.5 | 0 |
| 5.5 ~ 13.0 | 3 |
| 13.0 ~ | 5 |

CURRENT POSITION CALCULATING SYSTEM HAVING A FUNCTION FOR CORRECTING A DISTANCE FACTOR

BACKGROUND OF THE INVENTION

1. Field of the Invention

The present invention relates to a current position calculating system, which is installed on a mobile object such as a vehicle or the like, for measuring a travelled distance, a headed direction etc., and for calculating a current position of the vehicle according to the measured values. More particularly, it relates to techniques for correcting an error in measuring the travelled distance.

2. Description of Related Art

A current position of a vehicle is usually calculated based on a headed direction of the vehicle measured by a direction sensor such as a gyrocompass and a travelled distance of the vehicle measured by a vehicle speed sensor or a distance sensor.

Generally, a travelled distance of a vehicle is obtained by measuring the number of revolutions of an output shaft of a transmission or a tire and multiplying the result by a distance factor, which corresponds to a distance the vehicle travelled for each revolution of the tire.

In addition, there is known a technique in which in order to correct an error in the current position obtained from the headed direction and the travelled distance as described above the obtained current position of a vehicle is corrected so as to match the same with road data, what is called a map matching technique as disclosed in the official gazette of Japanese Patent Application Publication (KOKOKU) No. 13972/1994. This map matching technique can enhance an accuracy in calculating a current position.

Meanwhile, the diameter of a tire, which relates to a distance factor, varies continuously while driving, due to such factors as wearing away or expansion caused by a temperature change, of the tire. As a result, an error is generated in calculating the travelled distance and a highly accurate calculation of the current position cannot be performed. For example, one percent of error in the travelled distance factor for each revolution of the tire will result in an error of 1 kilometer if the travelled distance is 100 kilometers.

Such an error in measuring the travelled distance as described above can be corrected to a certain extent by using the aforementioned map matching technique if it is applied to driving on an ordinary road. Even though the current position can be corrected by the map matching technique at a point of intersection or the like, the technique itself cannot correct the distance factor and it is impossible to avoid an accumulation of errors in the travelled distance.

Moreover, once an error of approximately 1 kilometer is produced between the estimated current position and the actual current position, it will be difficult to correct the position according to the map matching technique.

So far, the following techniques have been employed for avoiding errors in measuring a travelled distance:

(1) correcting a distance factor by comparing the road data from the point of turning at an intersection (a starting point) to the point of turning at the next intersection (a terminal point), with the travelled distance obtained by measuring the number of revolutions of an output shift of a transmission or a tire; (2) correcting the aforementioned distance factor by comparing the distance between two beacons on a map, with the distance measured by driving as disclosed in the official gazette of Japanese Patent Application Publication (KOKOKU) No. 27652/1994; and (3) correcting the aforementioned distance factor by obtaining a vehicle speed from the GPS (Global Positioning System) receiving device for calculating a current position using the signals from the GPS satellites and comparing the obtained vehicle speed with a detected number of revolutions of a tire, as disclosed in the official gazette of Japanese Patent Application Laid-open (KOKAI) No. 107958/1990.

However, an accurate correction may not be performed in the technique (1) described above due to even a slight curve of the road or meandering of the vehicle. It is also difficult to precisely identify the aforementioned starting point and/or the terminal point.

Similarly, accurate correction may not be performed in the technique (2) in a condition where the road is not straight and there is also a problem of installing beacon equipment which can be used on a vehicle.

Moreover, in the technique (3), it may occur that accurate speed information cannot be obtained if a vehicle runs at a low speed, and an error may be produced in a calculated speed due to a long processing time in the case of a significant change in the vehicle speed, and thus there is a problem that an accurate correction cannot be performed. Furthermore, it is necessary to install GPS receiving equipment and a GPS receiving antenna which can be used on a vehicle. There is also a problem that correction is disabled because of the absence of the GPS signals received when the vehicle is in such situations as passing through a tunnel, running under an elevated track or in the shade of buildings.

SUMMARY OF THE INVENTION

The present invention has for its object to offer a current position calculating system which can obtain an accurate position information of a vehicle by correcting a distance factor using various information at the time of turning left or right, without considering a driving condition and speed nor preparing any particular equipment.

Another object of the present invention is to offer a current position calculating system which can realize a more accurate correction of the distance factor considering various widths of roads where a vehicle turns left or right.

In one aspect of performance of the present invention for accomplishing the first object, a current position calculating system, which is installed on a vehicle moving in accordance with a wheel rotation and calculates a current position of the vehicle, comprises:

means for storing road data which represents a road map;

headed direction detecting means for detecting a headed direction of a vehicle;

rotational speed detecting means for detecting a rotational speed of a wheel;

travelled distance calculating means for calculating a travelled distance of the vehicle in accordance with the rotational speed of the wheel which is detected by the rotational speed detecting means and a predetermined distance factor;

current position estimating means for estimating a current position on a road where the vehicle exists thereon, in accordance with the detected travelled distance, the detected headed direction and the road map represented by the road data; and distance factor correction means for obtaining at a time of turning left or right, based on the detected travelled distance, the detected headed direction and the road data of the road map, a distance error amount which is an error in an output from the travelled distance calculating means with respect to an actual value it should be, and for correcting the distance factor in order to reduce the distance error amount.

This current position calculating system preferably comprises a left/right turning determining means for determining that a vehicle turns left or right when it is detected according to an output from the current position estimating means and an output from the headed direction detecting means that the vehicle has moved to a second road from a first road, and that both the angle formed by the headed directions before and after the moving, and the angle formed by the directions of the first and the second roads, are approximately 90 degrees.

The current position calculating system of the present invention obtains a distance error amount which is an error in the output from the travelled distance calculating means with respect to an actual value it should be, according to various information acquired at the time of turning left or right in a direction approximately at right angle, namely, (a) direction information of a vehicle, (b) a travelled distance (moving amount) calculated with a distance factor and (c) road data of a road map, and corrects the distance factor so as to reduce the distance error amount.

The time of turning left or right in a direction approximately at right angle is utilized, because it is relatively easy and accurate to obtain the distance error amount at that timing.

According to the present invention, a distance factor can be adequately corrected without considering a driving condition and a driving speed of a vehicle nor preparing any particular equipment for the GPS, etc.

In another aspect of performance of the present invention for accomplishing the second object, more accurate correction of a distance factor can be performed by correcting a distance error amount in accordance with road widths.

BRIEF DESCRIPTION OF THE DRAWINGS

FIGS. 7A–7D are illustrations for explaining a principle of calculating a distance error amount d in the embodiment of the present invention;

FIG. 10 is a flow chart showing a process for calculating the correcting amount hkin based on the road width data in the embodiment of the present invention.

DETAILED DESCRIPTION OF THE PREFERRED EMBODIMENTS

Now, an embodiment of a current position calculation system of the present invention will be described.

Figure 1:
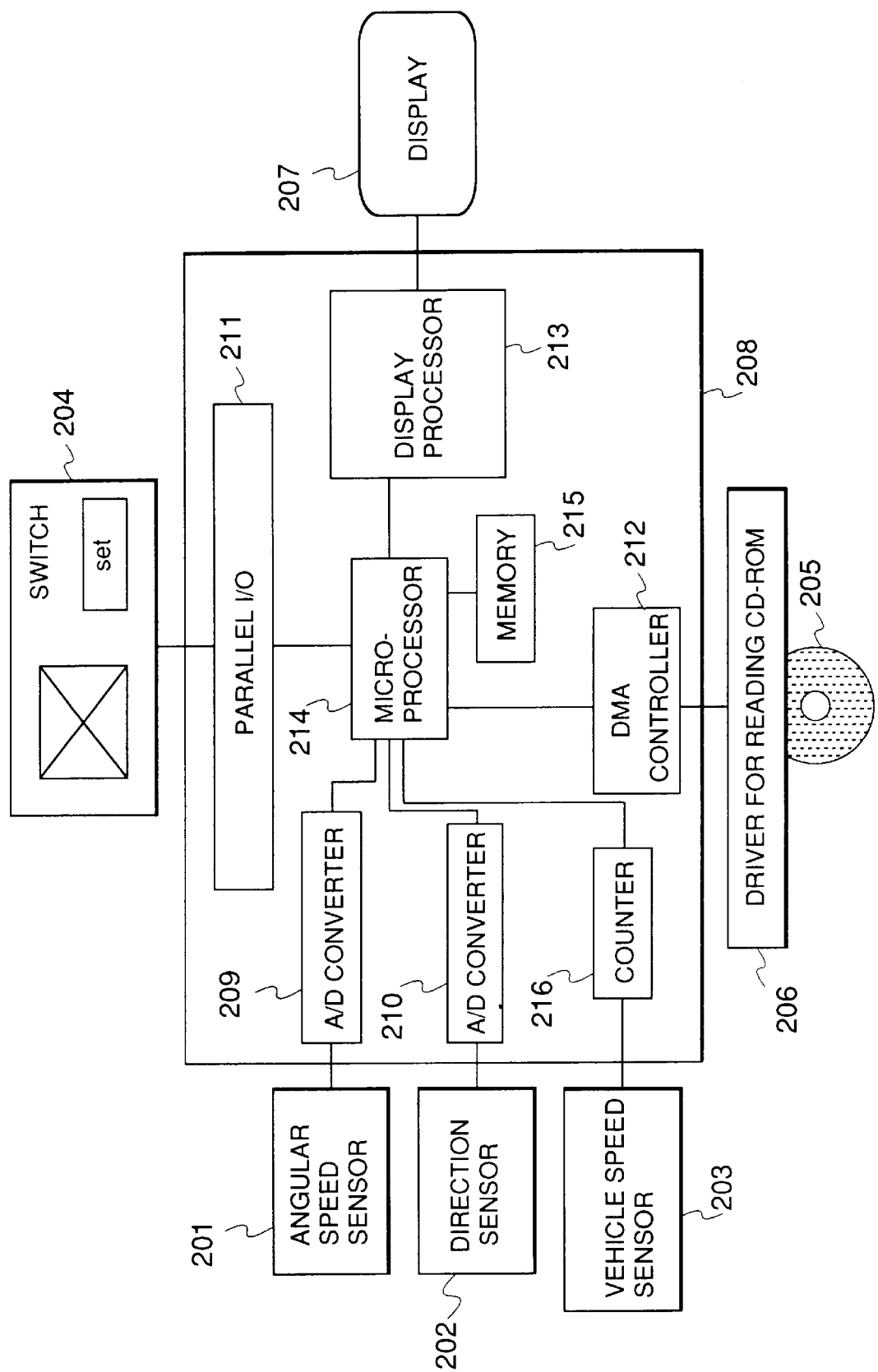
FIG. 1 is a block diagram showing a configuration of the current position calculating system in an embodiment of the present invention.

Referring first to FIG. 1, a configuration of the current position calculation system in this embodiment will be described.

The current position calculating system in this embodiment comprises an angular speed sensor 201 for detecting a headed direction change by detecting the yaw rate of a vehicle, a direction sensor 202 for detecting the headed direction of the vehicle by detecting the terrestrial magnetism, and a vehicle speed sensor 203 for outputting pulses at time intervals, the frequency of which is proportional to the rotational speed of the output shaft of a transmission.

It also comprises a display 207 which displays a map around a current position, a mark indicating the current position, etc., a switch 204 which receives a command from a user (a driver) for switching the scale of the map on the display 207, a CD-ROM 205 for storing the digital map data, and a driver 206 for reading the map data from the CD-ROM 205. In addition, a controller 208 is also provided for controlling the operations of each of the aforementioned peripheral equipments.

The controller 208 comprises an A/D converter 209 for converting the (analog) signal from the angular speed sensor 201 to a digital form, an A/D converter 210 for converting the (analog) signal from the direction sensor 202 to a digital form, a counter 216 for counting the number of pulses outputted from the vehicle speed sensor 203 per 0.1 second, a parallel I/O 211 for inputting whether or not the switch 204 is pressed, a DMA (Direct Memory Access) controller 212 for transmitting the map data read from the CD-ROM 205, and a displaying processor 213 for displaying a map image on the display 207.

Figure 2:
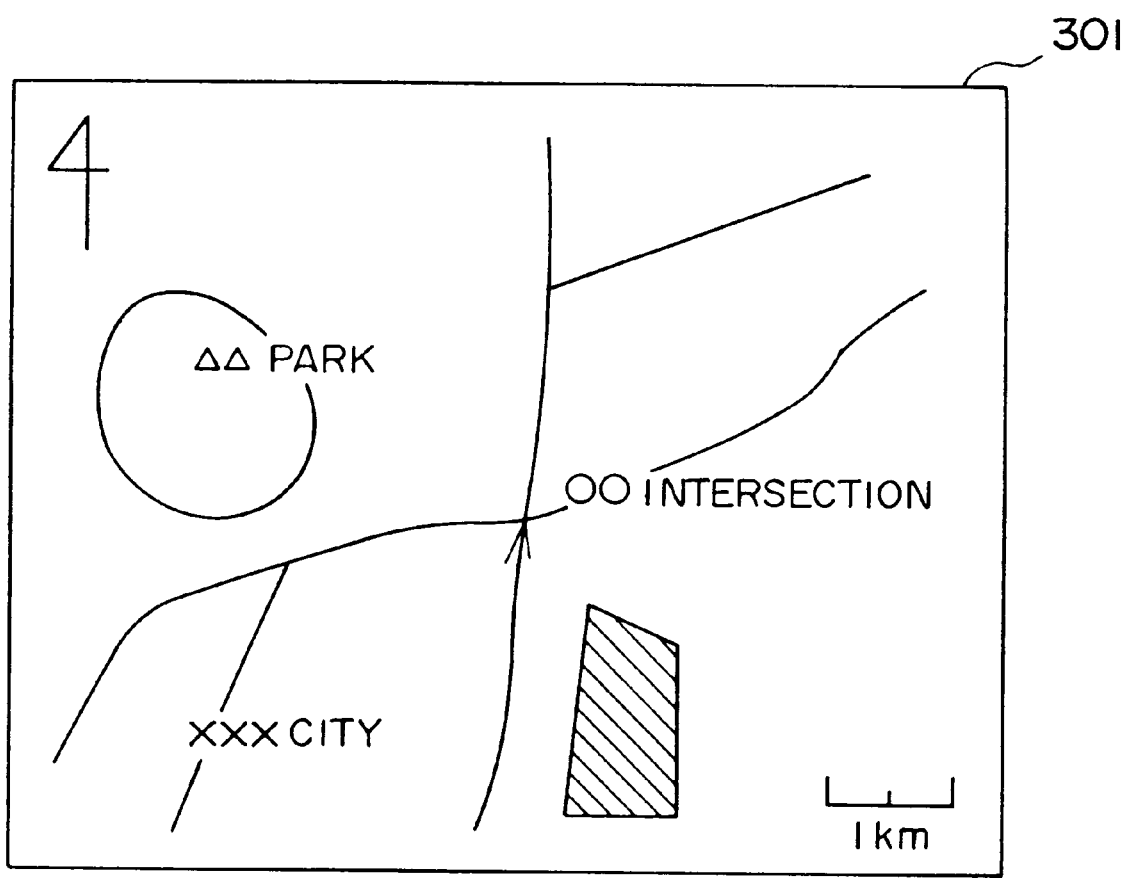
FIG. 2 is an illustration showing an example of display of a map and a current position in the embodiment of the present invention.

Moreover, the controller 208 is provided with a microprocessor 214 and a memory 215. The microprocessor 214 receives the signals from the angular speed sensor 201 obtained via the A/D converter 209, the signals from the direction sensor 202 obtained via the A/D converter 210, the outputted number of pulses of the vehicle speed sensor 203 counted by the counter 216, the information as to whether or not the switch 204 has been pressed, inputted via the parallel I/O 211, and the map data from the CD-ROM 205 obtained via the DMA controller 212, performs a process based on the above signals, calculates the current position of the vehicle, and displays the result on the display 207 via the display processor 213. The vehicle position is indicated at an arrow or the like which is displayed on the already-displayed map on the display 207, as shown in FIG. 2, with the result that a user is able to know the current position of the vehicle on the map. The memory 215 includes a ROM that stores programs defining the contents of processes (which will be described below) for executing the aforementioned operations and various tables described below, and a RAM for use as a working area when the microprocessor 214 performs the processes.

Hereinafter, operations of the current position calculating system in the embodiment will be explained.

At first, three processes will be described, that is, a process for calculating a headed direction and a travelled distance of a vehicle, a process for determining a current position of the vehicle according to the calculated headed direction and travelled distance, and a process for displaying the obtained position and direction of the vehicle.

Figure 3:
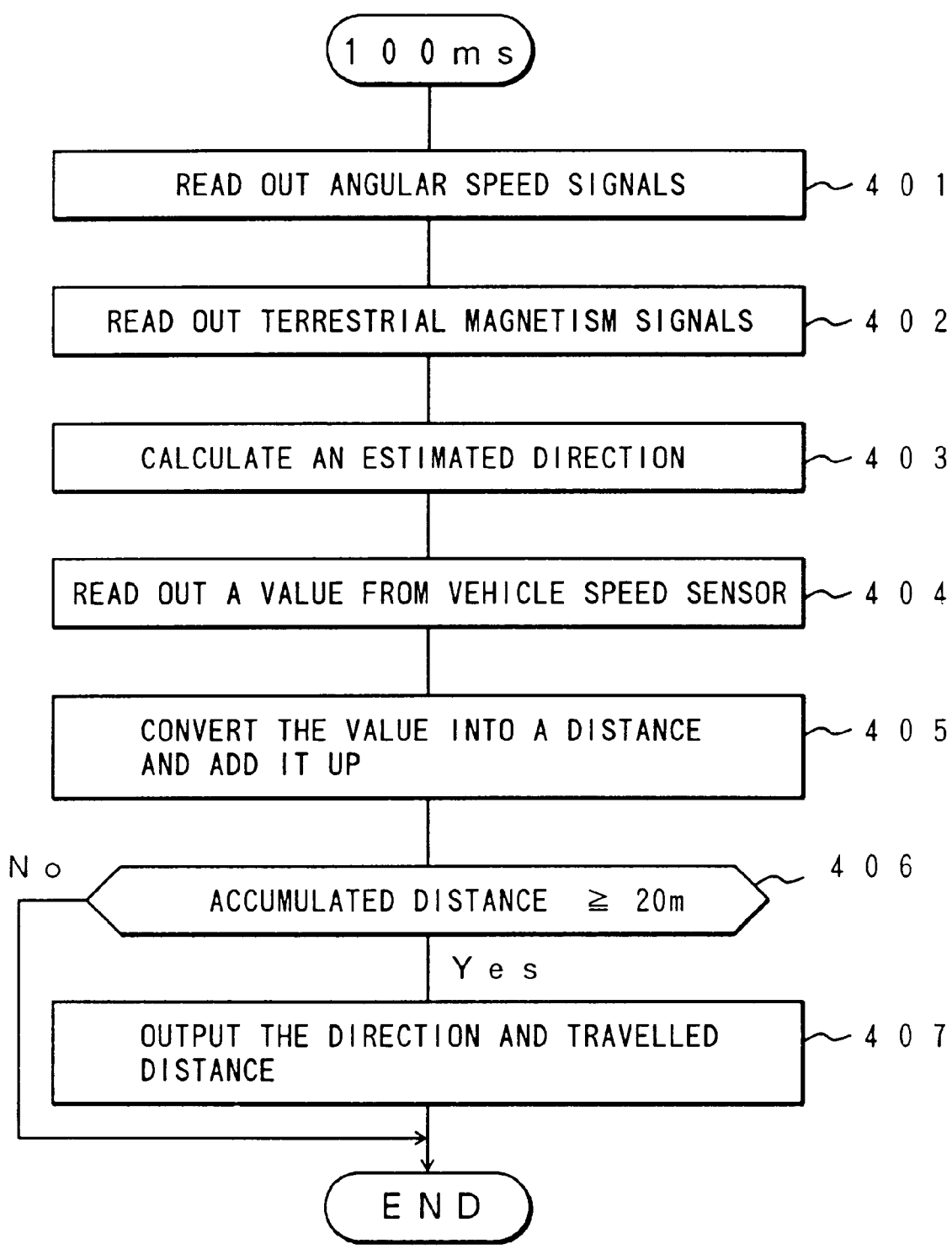
FIG. 3 is a flow chart showing a process for calculating a headed direction and a distance in the embodiment of the present invention.

Referring to FIG. 3, a flow of the process for calculating a headed direction and a travelled distance of a vehicle will be described.

This is a routine of a microprocessor 214, which is executed at regular intervals, for example, every 100 ms.

In this routine, firstly, an output value of the angular speed sensor 201 is read in from the A/D convertor 209 (step 401). Only a relative value (change) of the headed direction of the vehicle can be detected since the output value of the angular speed sensor 201 is offered as a direction change. Therefore, secondly, an output value from the direction sensor 202 is read in from the A/D converter 210 (step 402) and an estimated direction of the vehicle is determined according to an absolute direction calculated from the output value of the direction sensor 202 and the direction change (an angular speed output) outputted from the angular speed sensor 201 (step 403).

Since an error produced in the angular speed sensor is likely to be large if the vehicle speed remains low for a long time for example, the determination of the direction is performed by means of utilizing only the direction calculated from the output value of the direction sensor in the case where the vehicle speed remains low for more than a predetermined period of time.

Next, the number of pulses outputted from the vehicle speed sensor 203 is counted every 0.1 second at the counter 216, and the counted value is read in (step 404). The travelled distance for 0.1 second is obtained by multiplying this read-in value with a distance factor R (step 405). The method for obtaining the distance factor will be described below.

Next, the travelled distance value per 0.1 second which has been obtained as described above, is added to the previously obtained value, and it is checked whether or not the sum of the travelled distance has reached 20 meters (step 406). If the accumulated value is less than 20 meters ("No" in step 406), the current process is ended and another new process is started.

As a result of the calculation of the travelled distance, if the accumulated travelled distance has reached a predetermined value, for example, 20 meters ("Yes" in step 406), the headed direction and the travelled distance (20 meters) at that point in time are outputted (step 407). Additionally, in step 407, the accumulated distance is initialized and another accumulation of the travelled distance is started.

As a second process, the process for obtaining a current position of the vehicle according to a calculated headed direction and a travelled distance will be described.

Figure 4:
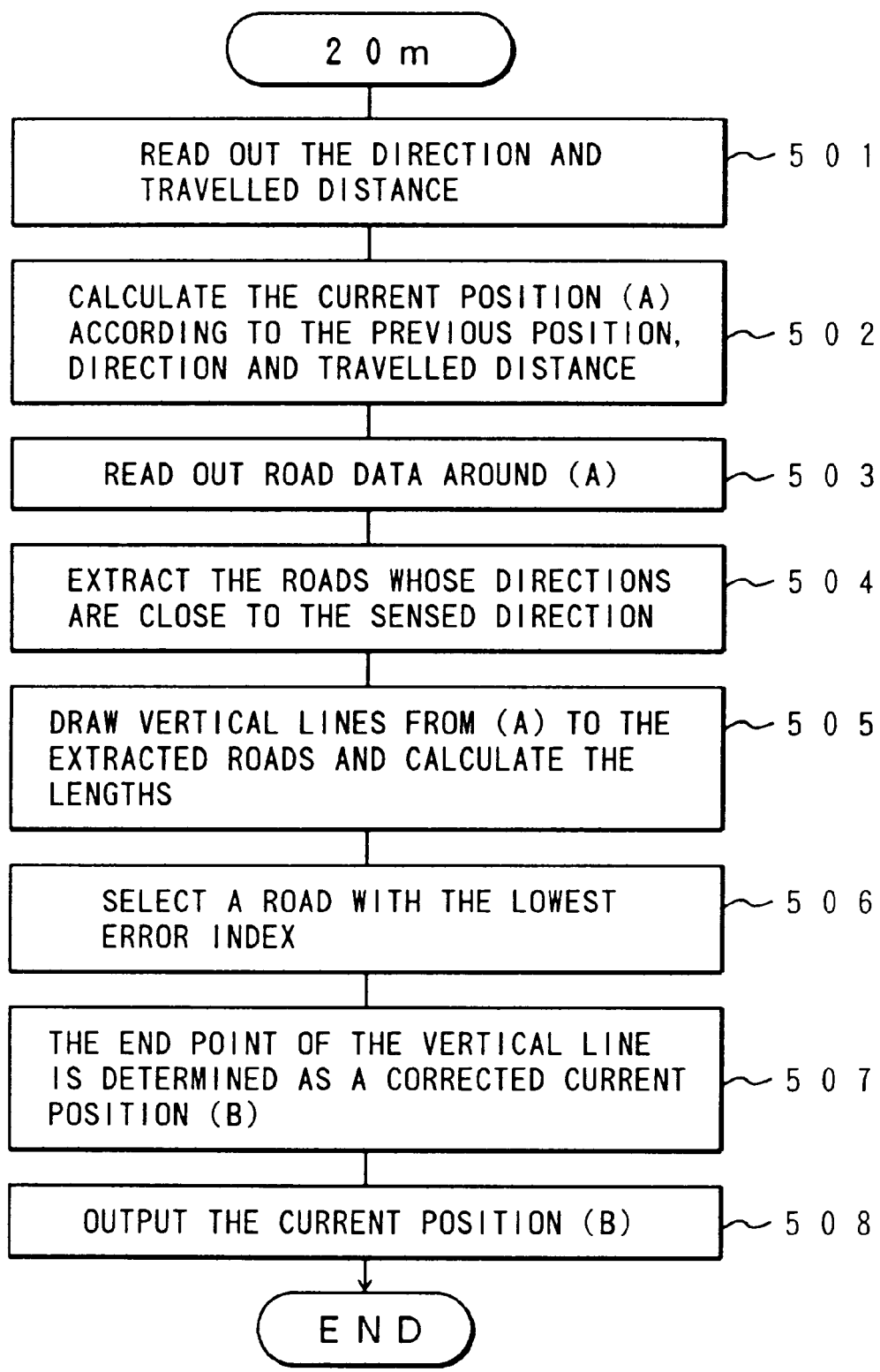
FIG. 4 is a flow chart showing a process for calculating a current position in the embodiment of the present invention.

Referring to FIG. 4, there is shown a flow of the process.

This process is triggered by receiving the output of the headed direction and the travelled distance from the process shown in FIG. 3, and executed as a routine of the microprocessor 214. In other words, this process is started up every time a vehicle travels 20 meters.

In this step, firstly, the headed direction and the travelled distance outputted from step 407 are read in (step 501).

Secondly, amounts of the vehicle movement in the latitudinal direction and in the longitudinal direction are obtained respectively, and the amounts of movement in the respective directions are added to the corresponding values indicating the current position (B) which have been obtained in the previous process to determine the current position (A) (step 502).

If there is no previously obtained current position, for example, just after starting the equipment, a predetermined position is used as a previously obtained current position to determine the current position (A).

Next, a map of the periphery of the current position (A) is read out from the CD-ROM 205, via the driver 206 and the DMA controller 213, and road data (line segments) within the area of a predetermined distance D, the center thereof being the current position (A) (step 503).

Figure 6:
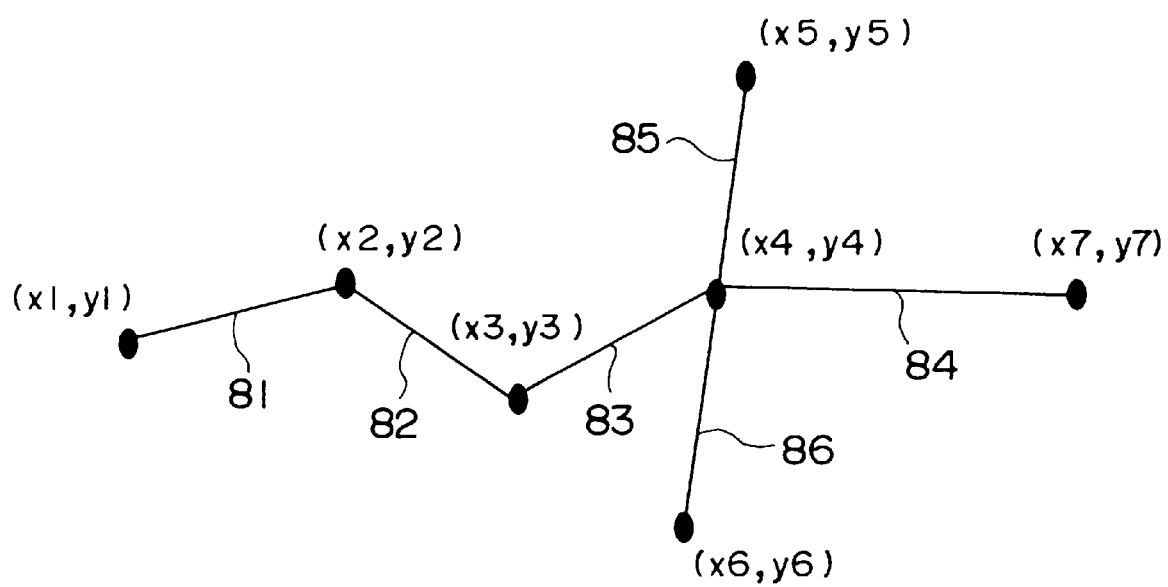
FIG. 6 is an illustration showing a format for representing the roads of the map data used in the embodiment of the present invention.

The road data can be approximated by a plurality of line segments, e.g., segments 81 to 86 as shown in FIG. 6, each of which is represented by a pair of coordinates of the starting point and the terminal point of the line segment. For example, the line segment 83 is represented by the starting point (x3, y3) and the terminal point (x4, y4).

Next, only the line segments, whose directions are within the predetermined angular range with respect to the given headed direction, are extracted from the line segments outputted in step 503 (step 504). In addition, vertical lines are drawn from the current position (A) to all the extracted line segments, and the lengths of vertical lines, namely, the distance from the current position (A) to the line segments, are obtained (step 505).

Next, those lengths of the vertical lines are used for calculating an error index value, defined in the following, for each of all the line segments extracted in step 504.

ERROR INDEX=$\alpha \times$|HEADED DIRECTION−LINE SEGMENT DIRECTION|+$\beta \times$|DISTANCE FROM THE CURRENT POSITION (A) TO THE LINE SEGMENT|

Here, $\alpha$ and $\beta$ are defined as zero or positive weighting factors. The values of these factors may be varied depending on which is important in the event of determining the road where the current position exists, the difference between the headed direction and the road direction or the difference between the current position and the line segment. For example, if a road is to be selected, whose direction is close to the headed direction, the value of a should be made larger.

After an error index of each line segment is calculated, a line segment having the lowest error index is selected (step 506), and a point of intersection of the selected line segment and the vertical line (the end point of the vertical line) is determined as a corrected current position (B) (step 507).

In the embodiment of the present invention, data items obtained at a predetermined number of points in time up to the current time, for example more than six, the data items at each point including the direction and the travelled distance obtained in step 502 (or moving amounts in both the latitudinal direction and in the longitudinal direction) and the current position (B) obtained in step 508, are accumulated until the current time, in the memory 215, for determining left or right turn and for calculating a distance error amount d as described below.

In step 503 as described above, road data (line segments) within the area of a predetermined distance D, the center thereof being the current position (A), have been extracted. Alternatively, the distance D may be a value determined by the error index amount of the road which has been selected in the previous step 506.

The reason why the range for searching may be determined according to the error index amount is that if the error index amount is large, the accuracy of the previously obtained current position (B) may not be trustworthy and thus a wider range for searching a road should be preferable in obtaining an accurate current position.

As a third process, the process for displaying the obtained position and direction of a vehicle will be described.

Figure 5:
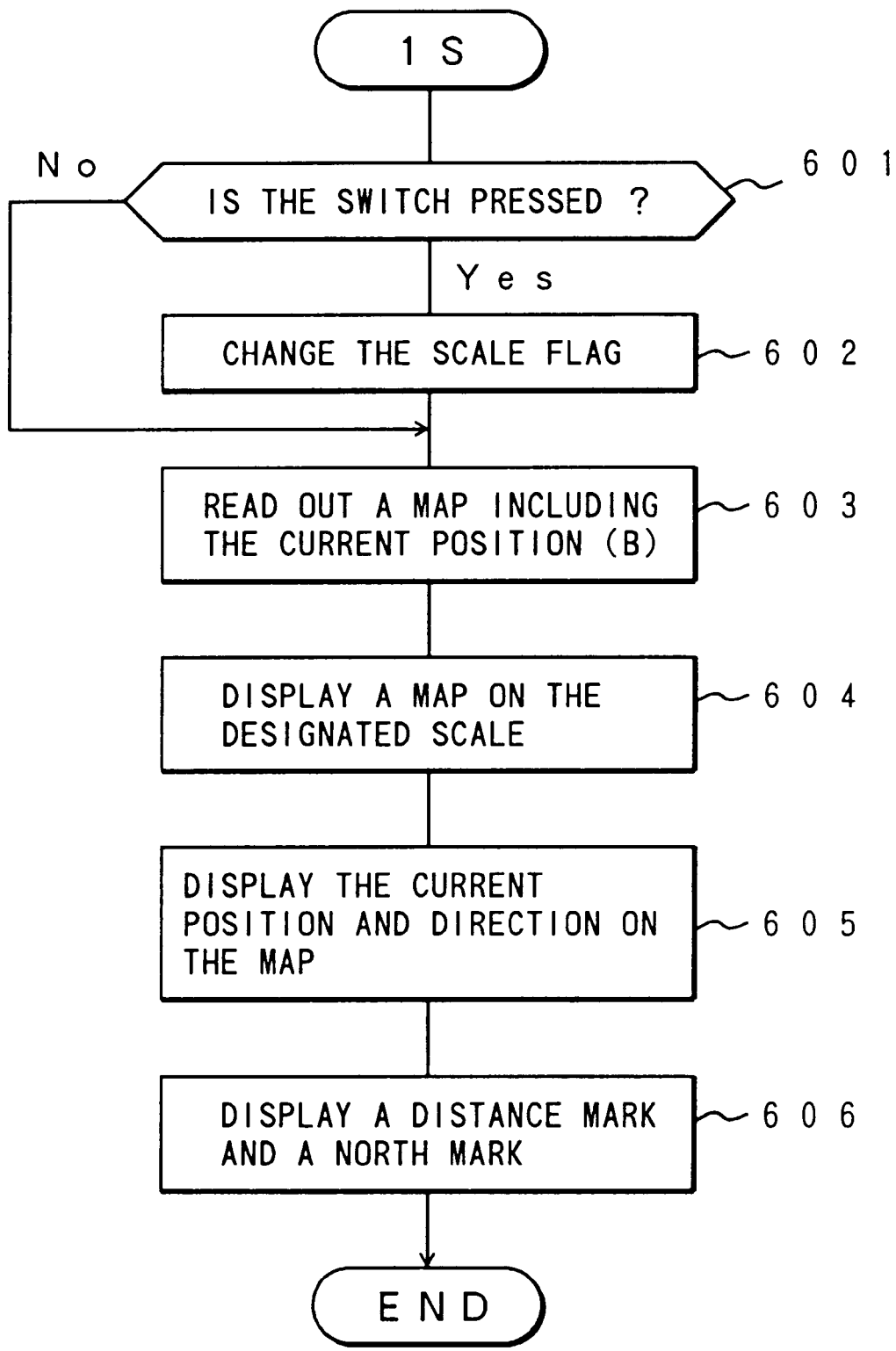
FIG. 5 is a flow chart showing a process of the current position display in the embodiment of the present invention.

FIG. 5 shows the flow of the process.

This process is a routine of the microprocessor 214, being started up and executed every second.

At first, according to the output from the parallel I/O 211, it is determined whether or not the switch 204 has been pressed so as to instruct to change the scale of the map (step 601). If it is pressed ("Yes" in step 601), a predetermined scale flag is set (step 602) corresponding to the instruction.

Next, the current position (B) obtained in the process of FIG. 4 is read out (step 603) and the map on the scale which may have been switched according to the contents of the scale flag in step 602 is displayed on the display 207, for example, as shown in FIG. 2 (step 604).

The position (B) and the headed direction of the vehicle are displayed, for example, with an arrow sign "↑" on the already-displayed map, as shown in FIG. 2 (step 605). Finally, a mark indicating the north direction and a ruler for representing a distance corresponding to the scale are overlaid on the map as shown in FIG. 2 (step 606).

In this embodiment, an arrow sign is used, as described above, to indicate the vehicle position and direction. However, the form for indicating a vehicle position and direction can be decided optionally, as long as the position and the headed direction are definitely indicated. A mark indicating the north direction, etc., can be similarly varied.

Referring next to FIG. 3, a method for obtaining the distance factor R which is used for calculating a distance in step 405 will be described.

As described above, the travelled distance of a vehicle is obtained by multiplying the number of pulses outputted from the vehicle speed sensor 203 by the distance factor R. However, the travelled distance per revolution of a tire varies due to such factors as wearing away of the tire, and if the distance factor is defined as a fixed value, the distance is not accurately obtained as the vehicle travels. Thus, in the embodiment of the present invention, it is decided whether the measured vehicle position is ahead or behind with respect to the actual position, by obtaining an error in the travelled distance at the time of turning left or right of a vehicle at an intersection in a direction approximately at right angle, and the distance factor R is dynamically corrected. In the meantime, it is possible to obtain this distance error amount by comparing the road data from the aforementioned time of turning at an intersection to the time of turning at the next intersection, with the travelled distance therebetween which is obtained from the measured number of revolutions. However, in the embodiment of the present invention, another method is used. Hereinafter, this another method will be described in detail, referring to FIGS. 7A–7D.

FIGS. 7A–7D show four cases which are combinations of turning left/right, and an overshoot/undershoot at the measured current position due to an oversize or an undersize of the distance factor. The term of measured current position here indicates a current position at any place being on or off a certain road without being corrected by the map matching. These four cases are, specifically, FIG. 7A is an overshoot in turning left, FIG. 7B is an undershoot in turning left, FIG. 7C is an overshoot in turning right, and FIG. 7D is an undershoot in turning right. In FIGS. 7A–7D, a series of small white circles indicate measured current positions without corrections by the map matching, and the crossed lines represent an intersection according to road data.

The overshoot in turning left, in FIG. 7A, occurs when the distance factor is larger than an appropriate value. That is, it corresponds to the event where the measured current position is estimated to have reached the point of the intersection, even if actually it has not, due to an excessively large distance factor. In this embodiment, a distance between the subsequent road after completing a left or right turning, and the measured current position, is obtained as a distance error amount d (>0). In accordance with the distance error amount d, the distance factor R is updated to be reduced. A method for this updating will be described below. A result of map matching is displayed on the screen, and thus a current position (B) is determined on any of the roads according to the aforementioned error index.

The undershoot in turning left, in FIG. 7B, occurs when the distance factor is smaller than an appropriate value. That is, it corresponds to the event where the measured current position is estimated to have not reached the point of the intersection yet, even if actually it has already turned the intersection, due to too small a distance factor. A distance error amount d (>0) is obtained similarly to the overshooting case, but on this occasion, the distance factor R is updated to be enlarged.

A similar process is applied to the remaining cases, overshooting and undershooting in turning right, in FIGS. 7C and 7D.

The distance factor R is corrected for example as follows. A correcting factor Rcv for correcting the distance factor R is introduced based on the distance error amount d obtained in turning left or right. The distance factor R is dynamically corrected in accordance with:

DISTANCE FACTOR $R = R(\text{PREVIOUS VALUE}) \times (1 + Rcv)$.

Figure 8:
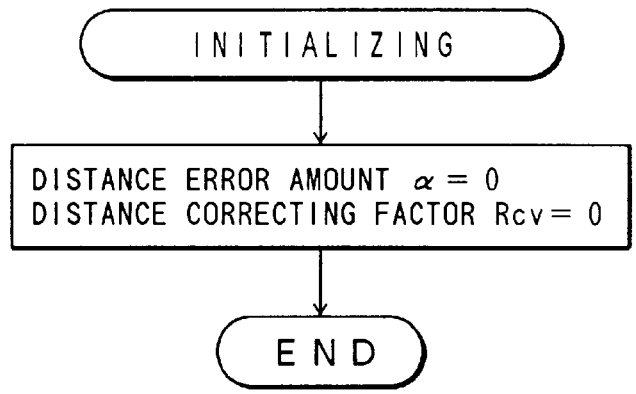
FIG. 8 is a flow chart showing an initializing process performed in the embodiment of the present invention.

As shown in FIG. 8, the distance error amount d and the distance correcting factor Rcv are reset to zero in an initializing process just after starting up the device. At this time, the distance factor R is R0 as an initial value.

Figure 9:
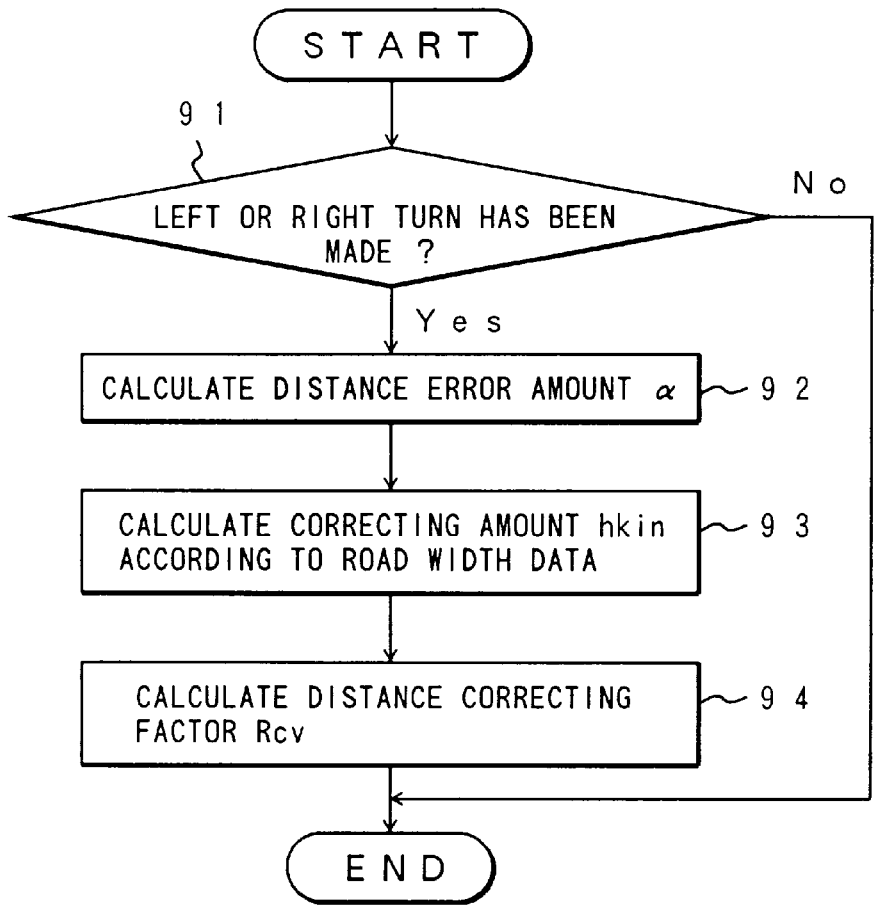
FIG. 9 is a flow chart showing a process for calculating the distance correcting factor Rcv in the embodiment of the present invention.

Referring to FIG. 9, there is shown a processing procedure for obtaining the distance correcting factor Rcv. This process is executed periodically while driving, for example, every time a new current position is obtained. That is, at first, it is determined whether the turning is to the left or to the right (step 91). A specific method for this step will be described below. If no turning is made, the process ends at this step. When it is determined that a left or right turn has been made, a distance error amount d is calculated according to the method described below (step 92). Next, a correcting amount hkin is calculated from the road width data (step 93). The meaning and the details of the process will be described below. The distance correcting factor Rcv is calculated according to the distance error amount d and the correcting amount hkin, obtained in steps 92 and 93. The details of this process will also be described below.

In the above step 91, it is determined whether or not the turning has been made approximately at right angle. The reason why the turning should be approximately at right angle is that the distance error amount d can be obtained relatively easily and accurately with this angle. It is determined that the turning left or right has been made when a shifting of a current position (B) from the first road to the second road is confirmed in the aforementioned map matching, and that vehicle directions (or the road directions) at the current positions (B) before and after the turning form approximately a right angle (for example, within the range of 90 degrees ±20 degrees). It is decided that the turn has been made (completed) when a difference between an average direction and a current vehicle direction returns to less than a reference value after it has become equal or more than the reference value. This average direction is calculated from a predetermined number of sequential angles in the vehicle direction (for example, sequential six items) measured previously up to the current time. The decision as to whether the turning is to the left or to the right can be made easily, considering the relationship between the directions of the vehicle (or the road) before and after turning.

Here, the terms of "a first road" and "a second road" indicate not only roads having the intersection as shown in the figure, but also roads before and after turning, of a road being bent in an L-shape, a three-forked road, etc.

A method for calculating a distance error amount d in the above step 92 will be described. As explained in connection with FIGS. 7A–7D, a distance between a subsequent road (the second road) after completing a turn and the current measured position at that time is obtained as a distance error amount d (>0). This process can be performed easily based on data measured at a plurality of previous points in time, as described above. That is, a moving path or locus of a vehicle can be obtained without using a map matching, in other words, without considering whether the positions are on or off the road, by sequentially adding up the directions and travelled distances with reference to previous positions including a starting position of the turn on the first road, and the successive previous current positions (B). As a result, a measured current position can be obtained at the time of turning completion. The length of a vertical line drawn from the current position to the second road is the distance error amount d to be obtained.

Next, as shown in step 93, a correcting amount hkin calculated from road width data will be described. For calculating the aforementioned distance error amount d, a distance between a second road and a measured current position is obtained. The position data of the second road is based on road data, which indicate the position of a center line of the road. Since vehicles run on a side of a road, the left side of the center line in Japan, if the road is extremely wide an error is produced in calculating a distance error amount d due to the road width. Thus, in the embodiment of the present invention, a distance error amount d is corrected based on the width of the second road. Specifically, the amount of d is increased in the event of turning left with an overshoot or turning right with an undershoot, and it is decreased in the event of turning left with an undershoot and turning right with an overshoot. The amount of the increase or decrease is decided depending on the width of the road. In a country where vehicles run on the right side of the center line, the relationship between the turning and the change in a distance error amount d can be defined vice versa.

In FIG. 10, there is shown an example for obtaining the correcting amount hkin for increasing or decreasing the distance error amount d in the embodiment of the present invention. In this embodiment, the correcting amount hkin is provided in advance as data stored in a table within a memory. In this example, when the road width is less than 5.5 meters, hkin=0 and when the road width is 5.5 meters or more and less than 13 meters, hkin=3 meters. If the road width is 13 meters or more, hkin=5 meters. The range for setting the correcting amount hkin can be classified into smaller groups. The table can be substituted with a method of obtaining hkin by multiplying the road width by a certain factor. The width of each road can be obtained from road data.

Figure 11:
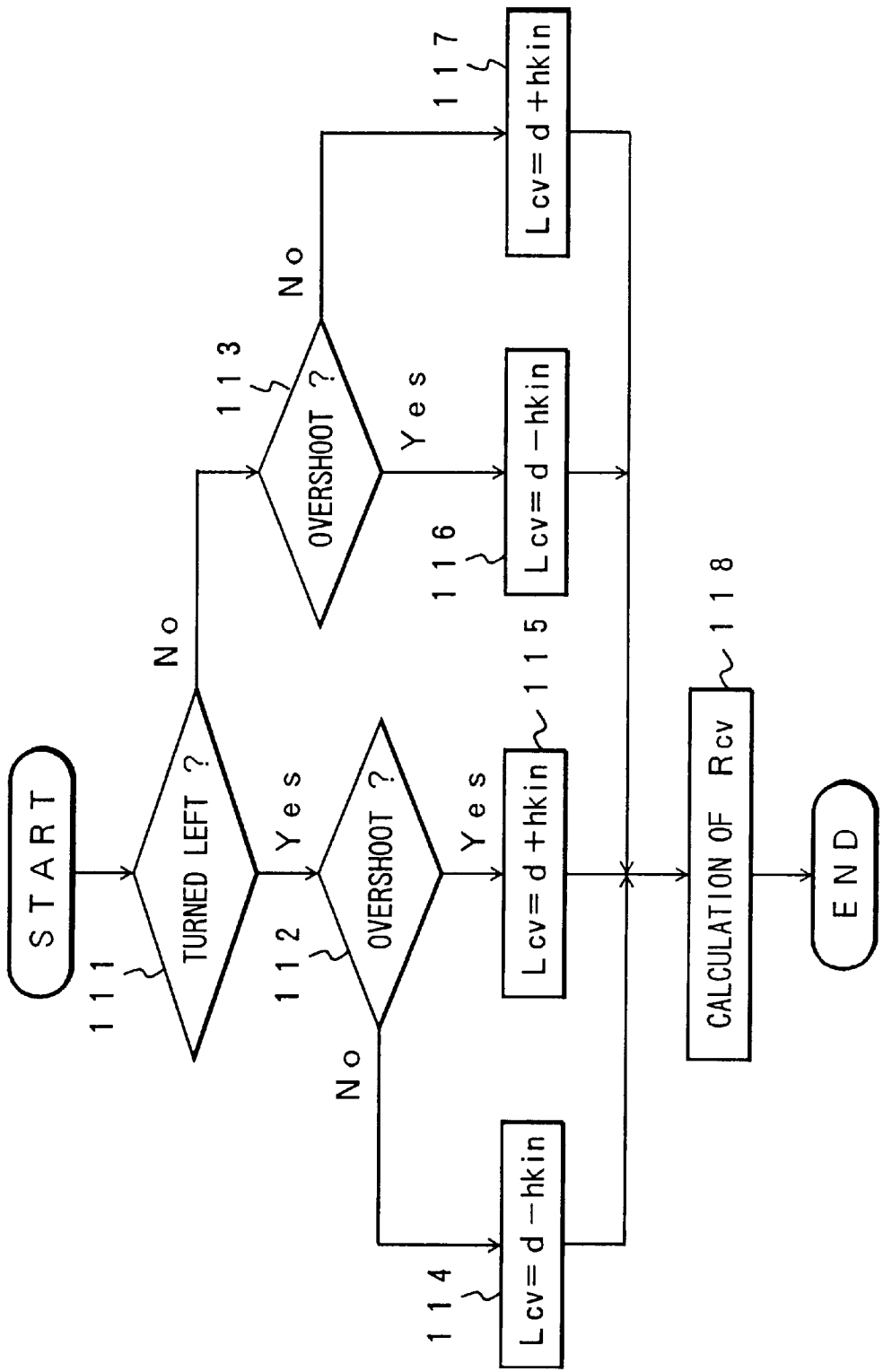
FIG. 11 is a flow chart showing a process for calculating a distance correcting factor Rcv in the embodiment of the present invention.

In FIG. 11, a processing flow for specifically calculating a distance correcting factor Rcv in step 94 (FIG. 9) is shown. At first, it is checked whether the turning is to the left or to the right (step 111) and whether it is an overshoot or an undershoot for each of the turnings (steps 112, 113). A corrected error amount Lcv is obtained respectively corresponding to the above cases. That is, in the event of turning left with an undershoot, Lcv is calculated as Lcv=d−hkin (step 114) and in the event of turning left with an overshoot, Lcv is calculated as Lcv=d+hkin (step 115). In the event of turning right with an overshoot, Lcv is calculated as Lcv= d−hkin (step 116) and in the event of turning right with an undershoot, Lcv is calculated as Lcv=d+hkin. (step 117). Based on the corrected error amount Lcv obtained through these steps, a distance correcting factor Rcv is calculated (step 118). In the embodiment of the present invention, the absolute value $|\Delta Rcv|$, which is an amount of change of Rcv, can be obtained:

$$|\Delta Rcv|=k \times Lcv.$$

Here, k is an appropriate positive real value which can be obtained from experience. In the case of an overshoot, the sign of $\Delta Rcv$ is set negative to decrease the distance factor R, since it is excessively large as described above. On the other hand, in the case of an undershoot, the sign of $\Delta Rcv$ is set positive to increase the distance factor R since it is too small.

As a result, an updated Rcv can be obtained by calculating Rcv=Rcv+$\Delta Rcv$.

As described above, according to the present invention, it is possible to correct a distance factor appropriately by using various information at the time a vehicle turns to the left or to the right. In addition, if a road width is taken into consideration, the distance factor can be corrected more precisely.

It is also possible to offer a current position calculating system which can precisely correct a distance factor without considering a driving condition and a driving speed of a vehicle nor preparing any particular equipment and which can obtain a vehicle current position with high accuracy.

What is claimed is:

1. A current position calculating system for installation on a vehicle moving in accordance with a wheel rotation and calculates a current position of the vehicle, said system comprising:

means for storing road data representing a road map;

a headed direction detecting means for detecting a headed direction of the vehicle;

a rotational speed detecting means for detecting a wheel rotational speed;

a travelled distance calculating means for calculating a travelled distance of the vehicle in accordance with the wheel rotational speed detected by the rotational speed detecting means and a predetermined distance factor;

a current position estimating means for estimating a current position on a road where the vehicle exists thereon, in accordance with the detected ravelled distance, the detected head direction and the road map represented by the road data;

a left/right turning determining means for determining whether the vehicle turns left or right from a first road to a second road;

a distance factor correcting means for obtaining at a time of turning left or right, based on the detected travelled distance, the detected headed direction and the road data of the road map, a distance error amount which is an error in an output from the travelled distance calculating means with respect to an actual value it should be, and for correcting the distance factor in order to reduce the distance error amount;

a storing means for accumulating a combination of data items obtained at a plurality of previous sequential points in time, said data items including the detected travelled distance, the detected headed direction and the current position where the vehicle exists, said distance factor correcting means estimating a moving path of vehicle positions whether the positions are on or off a road, according to the combination of said data items, after completing a left or a right turn, checking whether said moving path overshoots or undershoots the second road on the road map, and obtaining an amount of either of the overshoot and the undershoot as said distance error amount;

means for obtaining a width of said second road according to the road data; and means for correcting said distance error amount in accordance with the width of said second road.

2. A current position calculating system as defined in claim 1, wherein said left/right turning determining means determines that the vehicle turns left or right, when it is detected according to at least one of an output from the current position estimating means and an output from the headed direction detecting means that the vehicle has moved to the second road from the first road and that either of the angle formed by the headed directions before and after the moving and the angle formed by the directions of the first and the second roads, is approximately 90 degrees.

3. A current position calculating system as defined in claim 1, wherein:

a detection of the headed direction and the wheel rotational speed, and an estimation of the current position of the vehicle are performed every predetermined travelled distance which is constant.

4. A current position calculating system as defined in claim 2, wherein:

a detection of the headed direction and the wheel rotational speed, and an estimation of the current position of the vehicle are performed every predetermined travelled distance, which is constant.

5. A current position calculating system according to claim 1, wherein said means for correcting said distance error amount includes a table in which correction amounts are pre-stored corresponding to ranges of the width of said second road.

6. A method for correcting a distance factor for obtaining a vehicle travelled distance based on a wheel rotational speed, in a current position calculating system for installation on the vehicle to obtain a current position of the vehicle, comprising:

when the vehicle turns left or right at approximately right angle and moves from a first road to a second road, estimating a moving path of vehicle positions on or off a road according to the travelled distance determined based on headed directions sequentially obtained by a headed direction detecting means and a travelled distance determined based on travelled distances sequentially obtained according to the distance factor and the wheel rotational speed;

checking whether the estimated moving path of vehicle positions overshoots or undershoots the second road on a road map; and decreasing the distance factor depending on an amount of the overshoot when the moving path is an overshoot, and increasing the distance factor depending on an amount of the undershoot, when the moving path is an undershoot, wherein a width of said second road is checked according to the road data, and each amount of the overshoot and the undershoot is corrected in accordance with the width of said second road.

7. A method for correcting a distance factor according to claim 6, wherein the correction of each amount of the overshoot and the undershoot is performed referring to a predetermined table in which correction amounts are pre-stored corresponding to ranges of the width of said second road.

* * * * *